United States Patent [19]
Spaeh et al.

[11] Patent Number: 5,587,251
[45] Date of Patent: Dec. 24, 1996

[54] CERAMIC GAS SUPPLY COMPONENTS FOR FUEL CELLS COMPRISING ZIRCONIUM OXIDE SOLID ELECTROLYTE

[75] Inventors: Richard Spaeh, Ueberlingen; Wolfgang Schaefer, Friedrichshafen; Detlef Stolten, Uhldingen; Marco Fandel, Immentaad, all of Germany

[73] Assignee: Dornier GmbH, Immenstaad, Germany

[21] Appl. No.: 168,251

[22] Filed: Dec. 17, 1993

[30] Foreign Application Priority Data

Dec. 17, 1992 [DE] Germany .......................... 42 42 728.2

[51] Int. Cl.⁶ .............................. H01M 8/10; H01M 2/00
[52] U.S. Cl. ................................. 429/33; 429/34
[58] Field of Search .................... 429/33, 34, 38, 429/44, 45

[56] References Cited

U.S. PATENT DOCUMENTS 5,034,023  7/1991  Thompson .
5,171,646  12/1992  Rohr ............................................. 429/34
5,173,372  12/1992  Matsuo et al. ............................. 429/31

FOREIGN PATENT DOCUMENTS 4104841  8/1992  Germany .

*Primary Examiner*—George Fourson
*Assistant Examiner*—C. Everhart
*Attorney, Agent, or Firm*—Evenson, McKeown, Edwards & Lenahan

[57] ABSTRACT

Electrically insulating ceramic gas supply plenums for solid electrolyte fuel cells in which the plenums are formed from a mixture of ceramic components and the proportions of the components in the mixture are adjusted to match the coefficient of thermal expansion of the plenum to that of the solid electrolyte. A preferred ceramic is formed from a mixture of MgO and $Al_2O_3$ having a $MgO/Al_2O_3$ molar ratio of from 1:1 and 7:1.

17 Claims, 4 Drawing Sheets

CERAMIC GAS SUPPLY COMPONENTS FOR FUEL CELLS COMPRISING ZIRCONIUM OXIDE SOLID ELECTROLYTE

BACKGROUND OF THE INVENTION

Zirconium oxide solid-electrolyte fuel cells are electrochemical energy converters which generate current directly from gaseous energy carriers (such as $H_2$, CO, $CH_4$). They are based on zirconium oxide as an oxygen ion conducting solid electrolyte and are operated at temperatures of approximately 800° C. to 1,000° C. Since they are not subject to the Carnot Rule like thermal engines, they reach clearly higher efficiencies of about 50%. For this reason and because of their lower emission of pollutants, they have great potential as future energy converters, particularly if they use natural gas as the primary energy carrier.

In such fuel cells, a planar cell design is advantageous with respect to efficiency and high energy density. In this type of arrangement, thin solid-electrolyte plates are coated on both sides with porous electrodes and the coated plates are stacked above one another alternately with joining elements so that a bipolar arrangement is created. Several individual cells may be connected in series. These cell stacks are connected to form larger units by means of electric conductor systems and gas distribution lines.

The arrangements described above for fuel cells may also be used for the reverse process of high-temperature electrolysis in order to produce hydrogen from water at high efficiency at temperatures of approximately 800° C. to 1,000° C.

If, as currently preferred in the art, cross-flow gas lines are used, then it is considered advantageous to use gas distribution and collection components made of zirconium oxide or aluminum oxide. If other types of gas lines, such as internal gas lines are used, however, then metallic parts may also be used in part. However, such metallic parts must be electrically insulated with respect to the cells. However, all these solutions are subject to fundamental disadvantages. Zirconium oxide has the disadvantage that it is conductive to oxygen ions so that an electric shunt exists to the cells which lowers the efficiency and may even result in electrochemically induced degradation of materials used to construct the cell. If aluminum oxide is used, an expensive construction is required in order to compensate for the unequal thermal expansion between the cell stack and the gas supply components. Frequently, however, such compensating constructions frequently can only be achieved at the expense of gas-tightness. If metallic parts are used, complicated geometries are required for electrically insulating the cells, which cause high costs and adversely affect the manufacturing and operational reliability.

Materials used to construct solid-electrolyte fuel cells preferably include the following:

Electrolyte: $ZrO_2$ doped with CaO, MgO, $Y_2O_3$, or another rare-earth oxide, and optionally also containing added $Al_2O_3$;

Fuel Gas Electrode: Metal/ceramic composite materials containing nickel or cobalt as a metallic component and doped $CeO_2$ or $ZrO_2$ as the ceramic component;

Air Electrode: Doped oxide having a perovskite structure, such as $La_{1-x}Ca_xMnO_3$, $La_{1-x}Sr_xMnO_3$, $La_{1-x}Sr_xCo_yMn_{1-y}O_3$;

Connecting Element: Doped lanthanum chromite, such as $La_{1-x}Sr_xCo_yLaMg_xCr_{1-x}O_3$.

The foregoing components are united in the form of cell stacks to form gas-tight units.

In order to meet strict requirements with respect to gas-tightness at high temperatures as well as during heating and cooling, the coefficients of thermal expansion of all components must be well matched to each other.

Air and fuel gas are supplied under defined flow conditions to the cell stacks, and the waste gases or the depleted air are removed. For this purpose, gas-tight gas distribution and collection boxes are needed which must meet the following requirements:

The thermal expansion of the gas distribution and collection components must correspond to that of the other fuel cell components, particularly the $ZrO_2$-electrolyte.

The gas distribution and collection components must be resistant to high temperatures in the presence of air, on the one hand, as well as to fuel gases, such as $H_2$, $CH_4$ or CO, on the other hand.

The gas supply components must be electrically insulating at their operating temperature so that they do not represent a shunt to the cell stack.

The gas supply components must be capable of being manufactured at reasonable cost, and it must be readily possible to connect them to the cell stack in a gas-tight manner.

Prior to the present invention, no unitary system was known that could meet all four of the foregoing requirements.

SUMMARY OF THE INVENTION

In accordance with the invention, a mixture of two or more ceramic substances is therefore used, one of which has a higher coefficient of thermal expansion than required, and the other of which has a lower coefficient of thermal expansion than required. The coefficient of thermal expansion can be varied as desired by appropriately selecting the volume ratio or, derived from that, of the molar ratio of the components of the mixture. So long as the substances do not react with one another, the resulting coefficient of expansion can be calculated from the average of the individual values adjusted by a factor proportional to the volume ratio of the components of the mixture.

In accordance with a particularly preferred embodiment of the invention, a binary $MgO$—$Al_2O_3$ system is used which contains MgO and $Al_2O_3$ in a molar ratio of from 1:1 to 7:1. Since the 1:1 limiting ratio of this composition range corresponds to a magnesium spinel having the formula $MgO.Al_2O_3$ (or written differently: $MgAl_2O_4$), the compositions of the invention can be viewed as magnesium spinels which may contain a stoichiometric excess of MgO. The ceramic may further comprise a positive amount of up to 3 mole % of at least one oxide selected from the group consisting of FeO, $Fe_2O_3$, $ZrO_2$, $SiO_2$, CaO, SrO, $Na_2O$, $K_2O$, $TiO_2$ and $Cr_2O_3$.

A 1:1 molar mixture of $MgO/Al_2O_3$ has a coefficient of thermal expansion which is smaller than that of $ZrO_2$. Since the coefficient of thermal expansion of a $MgO/Al_2O_3$ mixture rises as the MgO-content increases, a mixture having a coefficient of thermal expansion which precisely matches that of $ZrO_2$ can be prepared by controlled addition of additional MgO to magnesium spinel.

Since $MgO.Al_2O_3$ (spinel) and MgO are both resistant to high temperatures, electrically insulating, and resistant to chemical reduction by the fuel gases, the mixed ceramics which are formed from mixtures of these materials in accordance with the invention also possess these same desirable properties.

Sintered ceramic parts formed from mixtures of MgO and $Al_2O_3$ can be manufactured and connected to the other parts of the solid electrolyte fuel cell using the same established manufacturing and joining techniques used in the art to manufacture and connect parts made of spinel ($MgO.Al_2O_3$) or MgO.

As the raw materials for the gas supply components, MgO-powder and $MgO.Al_2O_3$-powder may be used which are commercially available at low prices. Thus, all above-described partial requirements are met. The principle of the invention in which the coefficient of thermal expansion is adjusted by varying the mixing ratio of two substances, may also be applied to ceramic systems other than $MgO/Al_2O_3$. For example, this same technique can be used to vary the coefficient of thermal expansion of sintered powder ceramic articles formed of mixtures of MgO and $SiO_2$. The ceramic may comprise $Mg_2SiO_4$ (forsterite) and have a coefficient of thermal expansion of approximately $10.3 \times 10^{-6}$ °K.$^{-1}$. Optionally, the ceramic may comprise $Mg_2SiO_4$ (forsterite) to which a stoichiometric excess of MgO has been added, such that the ceramic has a coefficient of thermal expansion greater than that of pure forsterite. Alternatively, the ceramic may comprise $Mg_2SiO_4$ (forsterite) to which a stoichiometric $SiO_2$-enstatite addition has been added, so that the ceramic has a coefficient of thermal expansion less than that of pure forsterite.

BRIEF DESCRIPTION OF THE DRAWINGS

The invention will be described hereinafter in further detail with reference to exemplary preferred embodiments illustrated in the accompanying drawings, wherein:

FIG. 1b is an enlarged view of the layers of an individual fuel cell of FIG. 1a;

DETAILED DESCRIPTION OF THE PREFERRED EMBODIMENTS

Figure 1A:
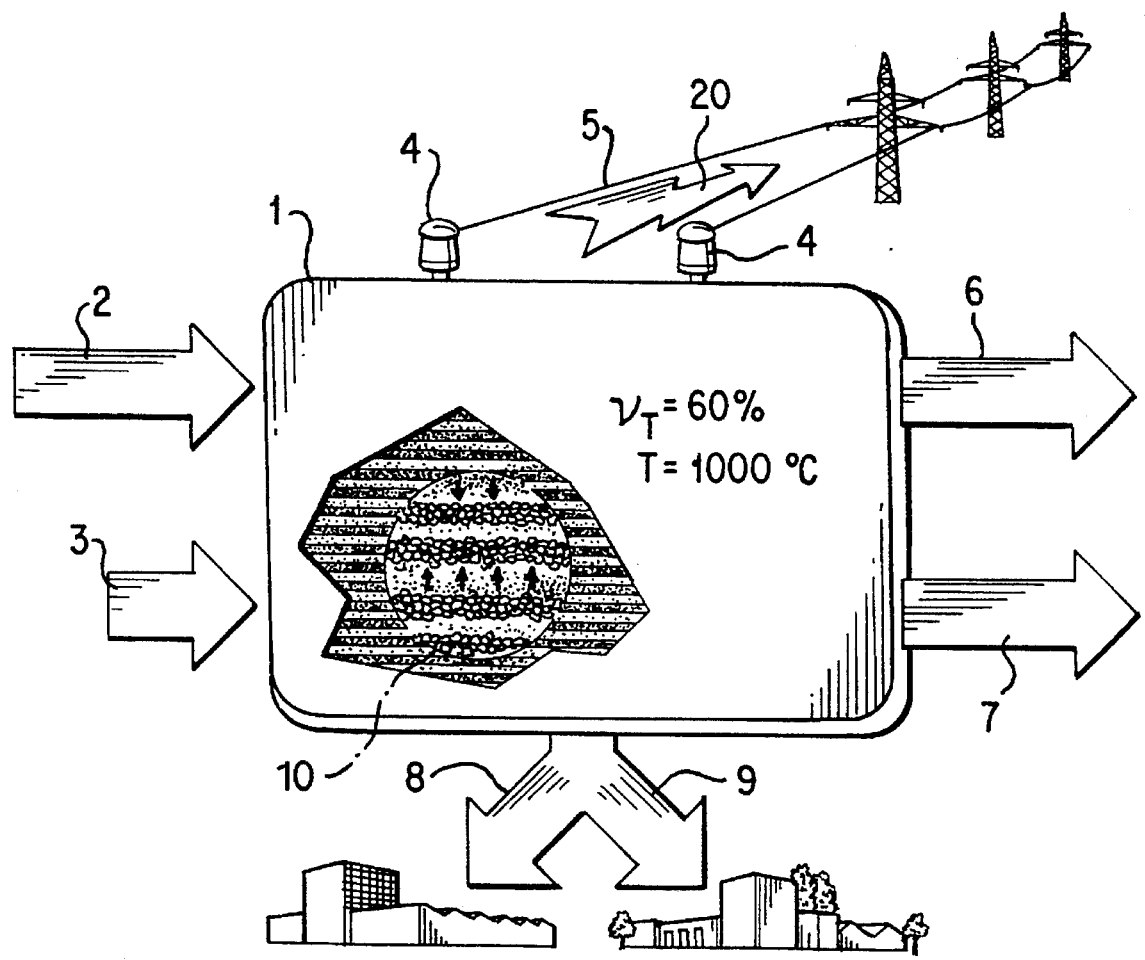
FIG. 1a is a schematic representation of a solid electrolyte fuel cell array comprising a series of individual cells of the type to which the present invention relates partially broken away to show the cell layers.

FIG. 1a is a schematic representation of a solid electrolyte fuel cell assembly constructed with electrically insulating gas supply components in accordance with the present invention. The multi-layer solid electrolyte fuel cell assembly is generally designated by reference numeral 1. A combustible fuel gas such as natural gas, hydrogen, propane, etc. is introduced as indicated by arrow 2 into gas supply components, described in further detail hereafter. Air or oxygen is also introduced through separate gas supply channels as indicated by arrow 3. The cell assembly comprises multiple layers of solid electrolyte gas-permeable electrodes. Oxidation of the fuel gas in the cell assembly generates electrical energy in the electrolyte layers, which in turn are electrically connected to output terminals 4 from which electrical energy is withdrawn from the cell through appropriate conducting lines 5. The oxidation of the fuel gas results in production of exhaust gas, primarily water vapor and carbon dioxide, which is withdrawn from the cell assembly as indicated by arrow 6. An oxygen-depleted exhaust air stream is also withdrawn from the cell assembly as indicated by arrow 7. Through use of appropriate heat exchange elements, process heat can also be withdrawn from the system for use in industrial processes, as indicated by arrow 8 or for heating buildings and the like as indicated by arrow 9. An enlarged view of the layers of the fuel cell assembly is schematically illustrated in window 10.

Figure 1B:
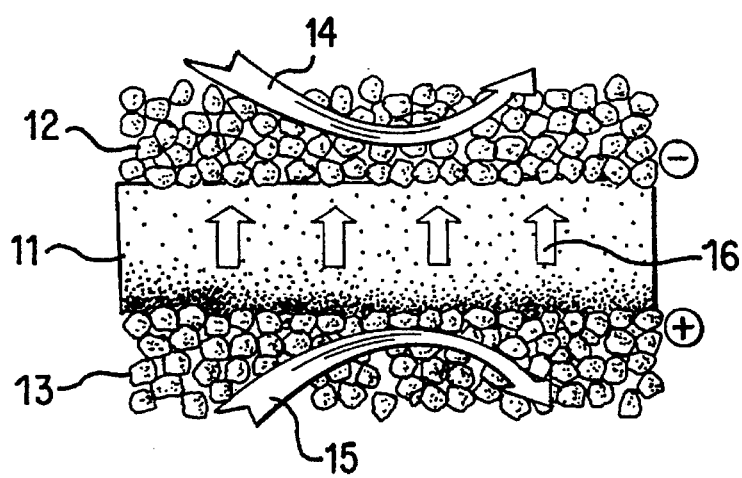

A further enlarged view of the solid electrolyte and gas-permeable electrodes is shown in FIG. 1b. Reference numeral 11 designates the solid electrolyte, which is composed of $CrO_2/Y_2O_3$. The gas-permeable fuel-gas electrode is designated by reference numeral 12 and the gas-permeable air electrode by reference numeral 13. The introduction of hydrogen, carbon monoxide, natural gas or other fuel gas into the fuel-gas electrode and withdrawal of water vapor, carbon dioxide therefrom is schematically represented by arrow 14. Similarly, the introduction of air or oxygen, and withdrawal of an oxygen-depleted gas stream are schematically illustrated by arrow 15. The flow of electricity within the solid electrolyte layer is illustrated by the arrows 16.

Figure 2:
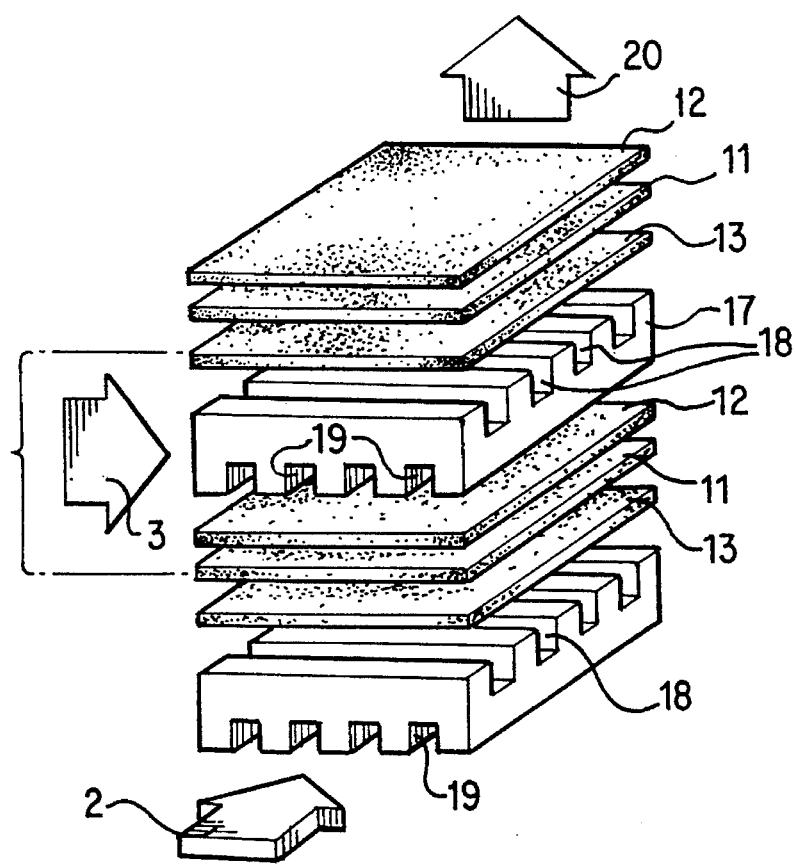
FIG. 2 is an exploded schematic representation of the fuel cell array of FIG. 1a illustrating the principles of its construction.

FIG. 2 is an exploded representation of two fuel cell modules which illustrate the construction of the cells. Each cell module comprises a solid electrolyte layer 11 with a fuel gas electrode 12 on one side and an air electrode 13 on the other side. Between each set of electrolyte and electrode layers, there is a connecting member 17 provided on its upper surface with a plurality of parallel air channels 18 through which air can be introduced as indicated by arrow 3 so that it can flow into the adjacent gas-permeable air electrode 13. The opposite (lower) surface of each connecting element 17 is provided with a plurality of parallel fuel gas channels 19, through which fuel gas can be introduced and flow into the adjacent gas-permeable fuel electrodes 12. In the illustrated embodiment, the air channels 18 and fuel channels 19 are arranged perpendicular to each other. This has the advantage of facilitating simple introduction of the respective gases through manifold chambers arranged at the sides or ends of the assembly without any need for special measures to prevent mixing of the gases. Fuel gas is introduced into channels 19 as indicated by arrow 2. The flow of electricity from the fuel cell assembly is illustrated schematically by arrow 20.

Figure 3:
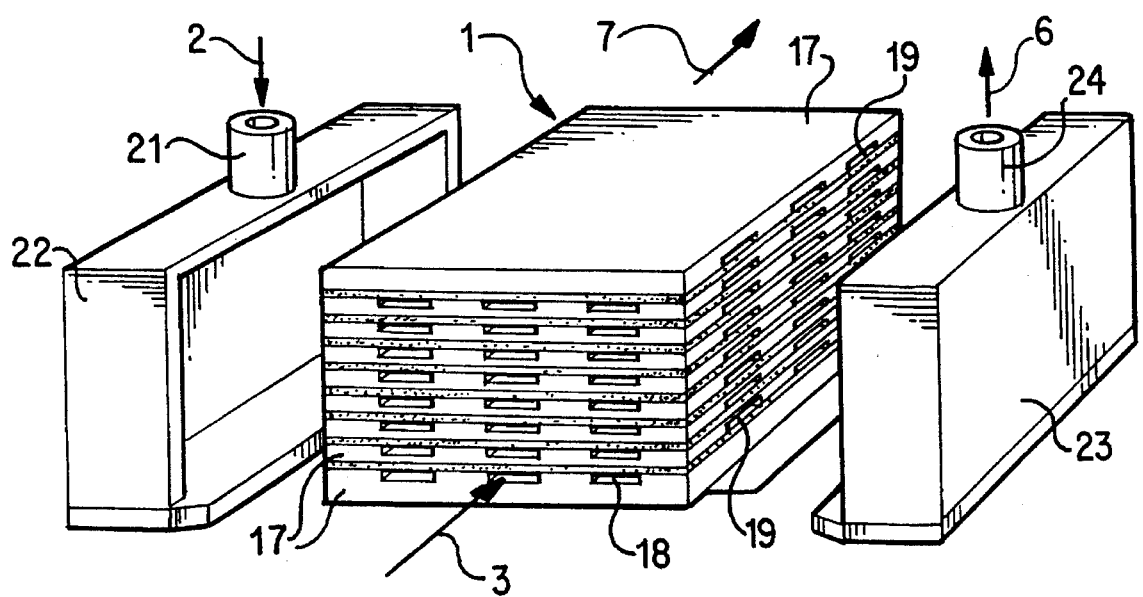
FIG. 3 is a partially exploded view of a solid electrolyte fuel cell array showing how the geometry of the gas supply components and how they are arranged at the sides of the stacked fuel cell layers.

FIG. 3 is a partially exploded view illustrating how the gas supply manifolds are attached to the assembled array of fuel cells. A flow of incoming fuel gas represented by arrow 2 enters an inlet 21 of a fuel gas supply manifold 22 from whence it enters the adjacent open ends of fuel gas supply channels 19 from which it can enter the gas-permeable fuel gas electrodes. Water vapor and carbon dioxide exhaust gases exit from the opposite ends of the fuel gas channels into a waste gas collecting manifold 23 from whence it is discharged through an outlet 24 as indicated by arrow 6. For purposes of illustration, manifolds 22 and 23 are shown exploded away from the fuel cell array 1, however, it should be understood that in actual operation, the manifolds are disposed contiguously to the fuel cell array in order to provide a gas-tight connection therebetween.

A flow of oxygen or air represented by arrow 3 is introduced into the air channels 18 which are formed in the top surfaces of connecting members 17, from whence the air can pass into the gas-permeable air electrode of the adjacent cell. For ease of illustration, the solid electrolyte and gas-permeable fuel and air electrodes are not shown separately, but are depicted as a single layer between adjacent connecting members 17, each set being depicted as a single layer. Oxygen-depleted air exits as indicated by arrow 7 from the opposite side of the array. The air is supplied from an air supply manifold similar to manifold 22 and collected in an air exhaust manifold similar to manifold 23, however, for simplicity of illustration, the air supply and air exhaust plenums are not shown in the drawing.

Figure 4:
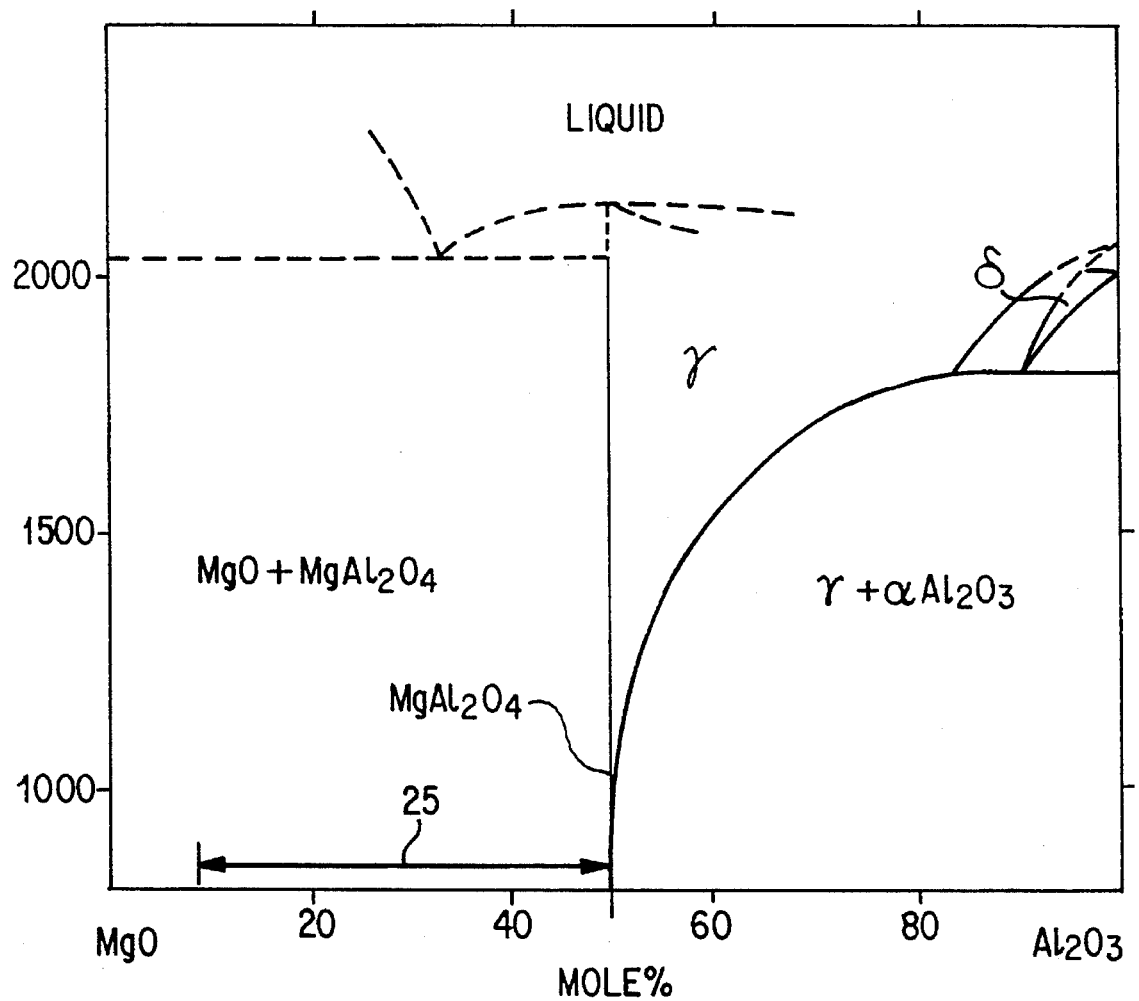
FIG. 4 is a phase diagram showing the working range for a binary system according to the invention.

FIG. 4 is a MgO—$Al_2O_3$ phase diagram at various temperatures which illustrates the effective working range of the solid electrolyte. The effective working range in mole percent is illustrated by the double-headed arrow and falls in that portion of the face diagram in which a solid mixture of MgO and $MgAl_3O_4$ is present.

Figure 5:
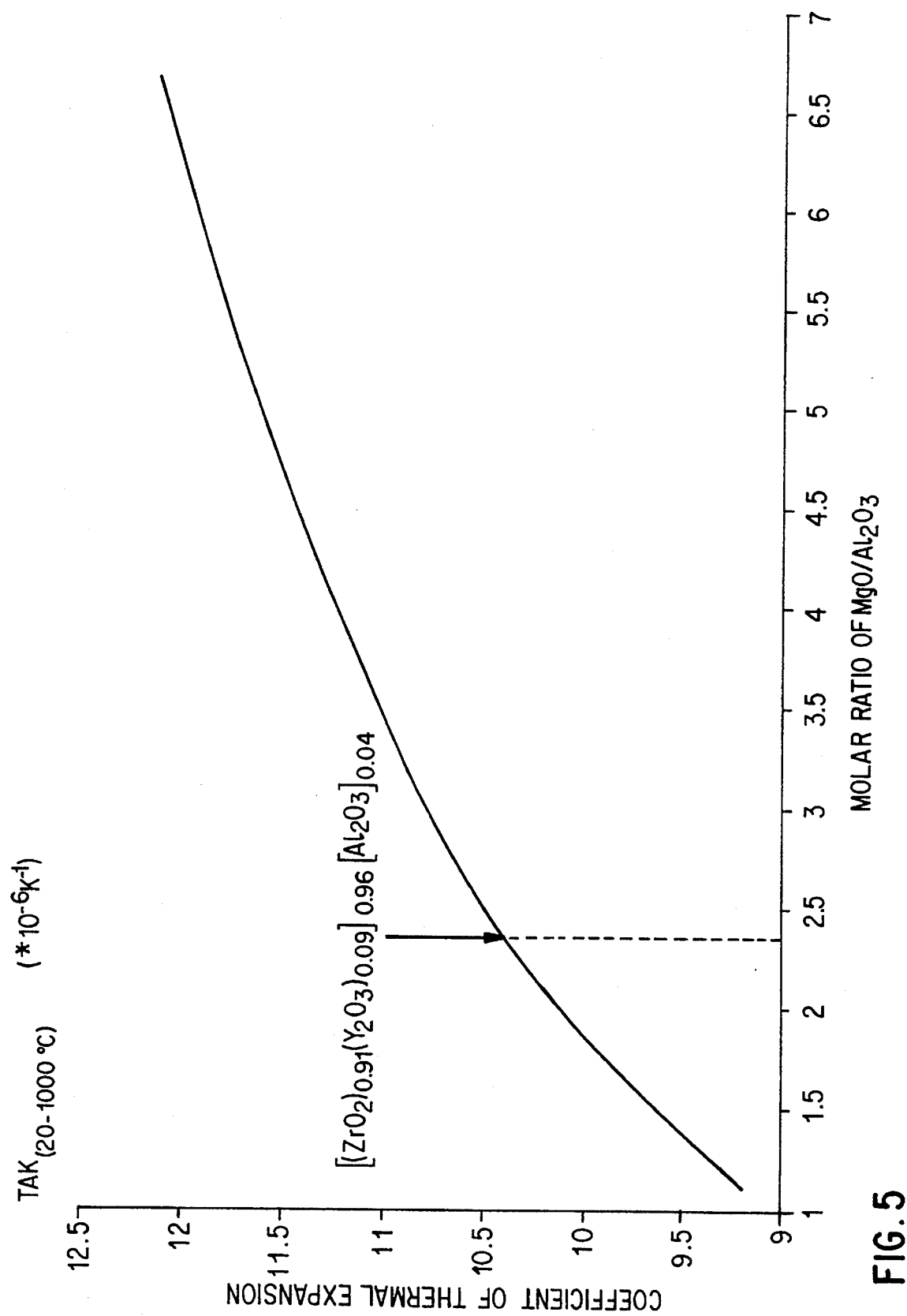
FIG. 5 is a graph of the coefficient of thermal expansion as function of the $MgO/Al_2O_3$ molar ratio.

FIG. 5 is a graph of the coefficient of thermal expansion of the ceramic material used for the plenums in the temperature interval from 20° to 1000° C. as a function of the molar ratio of MgO to $Al_2O_3$. The point at which the coefficient of thermal expansion of the ceramic equals that of the solid electrolyte is illustrated by the intersection of arrow 26 with the plotted curve. The solid electrolyte $[(CrO_2)_{0.91}(Y_2O_3)_{0.09}]_{0.96}[Al_2O_3]_{0.04}$ has a coefficient of thermal expansion of approximately $10.4 \times 10^{-6}$ °K.$^{-1}$. As can be seen from the graph, the magnesia/alumina ceramic attains a corresponding coefficient of thermal expansion at a molar ratio of MgO to $Al_2O_3$ of from about 2.3 to about 2.4. Manifolds formed of ceramic material having such a composition thus exhibit a coefficient of thermal expansion which closely corresponds to that of the solid electrolyte. As a result, as the fuel cell array is heated and cooled upon start-up or shut-down, it is nevertheless readily possible to maintain gas-tightness between the plenum and the fuel cell array.

The sintered ceramic gas distribution/collection chambers according to the invention were produced as follows: Powders of MgO and $MgO.Al_2O_3$ were mixed in the desired proportions to give a mixture containing the required ratio of MgO and $Al_2O_3$ to have a coefficient of thermal expansion corresponding to that of the solid electrolyte. The powder mixture was then pressed isostatically at 2,000 bar to the desired configuration. Alternatively, the mixture could be formed to the desired configuration by axial pressing at 1,000 bar. The shaped article was then sintered in air at 1,650° C., and the resulting solid article was mechanically finished to assure a proper fit.

Sintered test pieces were prepared from a series of powder mixtures having $MgO/Al_2O_3$ ratios varying between 1:1 and 7:1, and the electrical resistance and coefficient of thermal expansion of each test piece was measured. Gas distribution/collection boxes formed from the test materials were also subjected to joining tests with fuel cells and operating tests to determine if they could withstand the conditions encountered in actual fuel cell operation. As indicated by arrow 25 in the phase diagram of FIG. 4, the mole % of MgO in the test materials varied from about 9 mole to about 50 mole %, which corresponds approximately to the aforementioned $MgO/Al_2O_3$ ratio of 1:1 to about 7:1.

The relationship between the molar ratio of MgO to $Al_2O_3$ and the coefficient of thermal expansion is plotted graphically in FIG. 5. As can be seen from the graph, the coefficient of linear expansion increases as the proportion of MgO in the sintered mixture increases. The solid electrolyte mixture $[(ZrO_2)_{0.91}(Y_2O_3)_{0.09}]_{0.96}[Al_2O_3]_{0.04}$ has a coefficient of thermal expansion of approximately $10.4 \cdot 10^{-6}$ per °K. A corresponding coefficient of thermal expansion is achieved by a sintered powder mixture of MgO and $Al_2O_3$ containing approximately 2.35 moles of MgO for every mole of $Al_2O_3$. Thus, the coefficient of thermal expansion of the electrolyte can be matched by a gas distribution/collection box formed by sintering a powder mixture containing a molar ratio of MgO to $Al_2O_3$ of approximately 2.35.

The specific electric resistance of a sintered element having $MgO/Al_2O_3$ ratio of approximately 2.35 was measured and found to be $1.5 \cdot 10^6$ cm at 1,000° C. Gas-tight connections between gas distribution/collection chambers formed of a sintered $MgO/Al_2O_3$ ceramic having a molar ratio of MgO to $Al_2O_3$ of 2.35 with fuel cells formed with a solid electrolyte having the composition $[(ZrO_2)_{0.91}(Y_2O_3)_{0.09}]_{0.96}[Al_2O_3]_{0.04}$ were produced by fitting the pieces together or by soldering them together with an $SiO_2$-base solder at temperatures of about 1,200° C. Operating tests using completed fuel cells were successful, thereby showing that the gas-tight nature of the joint was maintained throughout the temperature range to which the fuel cell assembly was subjected during its operating cycle.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A gas manifold for a solid electrolyte fuel cell comprising an electrically insulating gas-tight ceramic formed from a mixture of a first ceramic component having a coefficient of thermal expansion less than that of said solid electrolyte and a second ceramic component having a coefficient of thermal expansion greater than that of said solid electrolyte, said first and second ceramic components being present in said mixture in such proportions that the ceramic formed from the mixture has a coefficient of thermal expansion substantially corresponding to that of said solid electrolyte.

2. A gas manifold according to claim 1, wherein said first ceramic component is MgO and said second ceramic component is $Al_2O_3$, and said first and second ceramic components are present in a molar ratio of MgO to $Al_2O_3$ in the range from 1:1 to 7:1.

3. A gas plenum according to claim 2, wherein said plenum comprises an electrically insulating ceramic having a coefficient of thermal expansion of from $9 \times 10^{-6}$ °K.$^{-1}$ to $12.6 \times 10^{-6}$ °K.$^{-1}$ in the temperature range from 20° C. to 1,000° C.

4. A gas manifold according to claim 1, wherein the proportions of the first and second ceramic components in said ceramic are adjusted so that the coefficient of thermal expansion of the ceramic in the temperature range from 20° C. to 1,000° C. is equal to the coefficient of thermal expansion of the solid electrolyte $\pm 10^{-7}$ °K.$^{-1}$.

5. A gas manifold according to claim 1, wherein said solid electrolyte has a composition corresponding to the formula

wherein $0.03 \leq x \leq 0.2$ and $0 \leq y \leq 0.25$; said solid electrolyte having a coefficient of thermal expansion which varies depending on the value of y in said formula.

6. In combination, a gas manifold according to claim 1, and a stacked array of planar solid electrolyte fuel cells, wherein said manifold is soldered in a gas-tight manner to an end of said stacked array of planar fuel cells.

7. A combination according to claim 6, wherein said manifold is soldered to said stacked array of planar fuel cells by a solder selected from the group consisting of glass solders, ceramic solders, glass ceramic solders and metal solders.

8. In combination, a gas manifold according to claim 1, and a stacked array of planar solid electrolyte electrolysis cells, wherein said manifold is soldered to an end of said stacked array of electrolysis cells.

9. A gas manifold according to claim 2, wherein said ceramic further comprises a positive amount of up to 3 mole percent of at least one oxide selected from the group consisting of FeO, $Fe_2O_3$, $ZrO_2$, $SiO_2$, CaO, SrO, $Na_2O$, $K_2O$, $TiO_2$ and $Cr_2O_3$.

10. A manifold according to claim 1, wherein said ceramic has a specific electric resistance at 1,000° C. of at least $5 \times 10^5$ Ωcm.

11. A gas manifold according to claim 1, wherein said first ceramic component is MgO and said second ceramic component comprises $SiO_2$.

12. A gas manifold according to claim 11, wherein said ceramic comprises $Mg_2SiO_4$ (forsterite) and has a coefficient of thermal expansion of approximately $10.3 \times 10^{-6}$ °K.$^{-1}$.

13. A gas manifold according to claim 11, wherein said solid electrolyte comprises $ZrO_2$.

14. A gas manifold according to claim 11, wherein said ceramic comprises $MgSiO_4$ (forsterite) to which a stoichiometric excess of MgO has been added, whereby said ceramic has a coefficient of thermal expansion greater than that of pure forsterite.

15. A gas manifold according to claim 11, wherein said ceramic comprises $Mg_2SiO_4$ (forsterite) to which a stoichiometric SiO-enstatite addition has been added, whereby said ceramic has a coefficient of thermal expansion less than that of pure forsterite.

16. A method of increasing the thermal durability of a solid electrolyte fuel cell assembly comprising a ceramic gas manifold attached in a gas-tight manner to an end of a stacked array of planar solid electrolyte fuel cells, said method comprising forming said gas manifold of a ceramic material formed from a mixture of a first ceramic component having a coefficient of thermal expansion less than that of said solid electrolyte and a second ceramic component having a coefficient of thermal expansion greater than that of said solid electrolyte, and adjusting the proportions of said first and second ceramic components in said mixture to substantially match the coefficient of thermal expansion of said gas manifold to that of said solid electrolyte.

17. A gas manifold according to claim 2 wherein the ceramic is a magnesium spinel which contains a stoichiometric excess of MgO prepared by controlled addition of additional MgO to magnesium spinel.

* * * * *